United States Patent
Terwijn et al.

(10) Patent No.: US 6,337,459 B1
(45) Date of Patent: Jan. 8, 2002

(54) MULTI-LAYERED ANTI-COKING HEAT RESISTING METAL TUBE AND THE METHOD FOR MANUFACTURING THEREOF

(75) Inventors: F. X. Terwijn, Amsterdam (NL); Kiyoshi Morii, Konan (JP); Yuko Takeuchi, Nagoya (JP); Yoshihisa Kato, Tsushima (JP); Hitoshi Hayakawa, Tokai (JP); Naoki Nishimura, Maebashi (JP)

(73) Assignee: Daido Tokushuko Kabushiki Kaisha, Aichi (JP)

( * ) Notice: Subject to any disclaimer, the term of this patent is extended or adjusted under 35 U.S.C. 154(b) by 0 days.

(21) Appl. No.: 09/546,429

(22) Filed: Apr. 10, 2000

(30) Foreign Application Priority Data

Apr. 9, 1999 (JP) .............................. 11-102810
Aug. 12, 1999 (JP) .............................. 11-228847

(51) Int. Cl.⁷ .................................................. B23K 9/02
(52) U.S. Cl. ............................... 219/121.47; 219/121.59
(58) Field of Search ..................... 219/121.47, 121.45, 219/121.46, 145.1, 145.21, 146.1, 146.21, 146.22, 146.41, 137 WM, 121.59; 118/667, 665, 214–216; 427/451; 148/206, 519; 420/586.1

(56) References Cited

U.S. PATENT DOCUMENTS

| 4,443,406 A | * | 4/1984 | Sukekawa et al. ........ 420/586.1 |
| 4,970,364 A | * | 11/1990 | Muller ........................ 427/451 |
| 5,021,629 A | * | 6/1991 | Shimomura ............ 219/121.59 |
| 5,855,699 A | * | 1/1999 | Oyama et al. ............... 148/519 |
| 5,873,950 A | * | 2/1999 | Ganesan et al. ............ 148/206 |

* cited by examiner

Primary Examiner—Teresa Walberg
Assistant Examiner—Q Van
(74) Attorney, Agent, or Firm—Bacon & Thomas

(57) ABSTRACT

A multi-layered heat resistant metal tube is disclosed. This tube has excellent anti-coking characteristics and is suitable for use under the conditions where carbon tends to deposit and accumulate thereon due to contacting with hydrocarbons at a high temperature. The tube is made by forming weld-mounted overlaid layer of a Cr—Ni—Mo alloy by building-up welding over the inner surface and/or the outer surface of a substrate tube made of a heat resistant metal. The Cr—Ni—Mo alloy consists essentially of, by weight %, Cr: 36–49 wt %, Ni: 35–63 wt % and Mo: 0.5–5 wt %. Building-up welding is preferably carried out by PPW (Plasma Powder Welding) in which the filler metal is supplied in the form of powder.

21 Claims, 4 Drawing Sheets

MULTI-LAYERED ANTI-COKING HEAT RESISTING METAL TUBE AND THE METHOD FOR MANUFACTURING THEREOF

BACKGROUND OF THE INVENTION

1. Field of the Invention

The present invention pertains A multi-layered heat resistant metal tube having excellent anti-coking characteristics and a method of manufacturing thereof. The multi-layered heat resistant metal tube is suitable for those tubes which are used in a high temperature and in a high carbonization potential environment as components of apparatus.

2. Description of the Related Art

High resistance to coking and carbonization, in addition to heat resistance, is required to some parts such as heat radiant tube of carburization-hardening furnaces, cracking tubes of thermal decomposition furnaces, particularly, ethylene cracking furnace tube or oil refinery cracking tube or all the other petrochemical thermal cracking furnace tube applications. Coking is a phenomenon of deposition and accumulation of carbon generated by thermal decomposition of hydrocarbons onto the surfaces of the metal tubes. This causes trouble of decrease in cross sectional area of furnace tubes, which may finally lead to blocking of the furnace tubes. Carbonization of metal is a carburization phenomenon of intrusion of carbon through the surf ace of the metal and diffusion of carbon into the inner part of the metal. This may either cause the coking or directly be processed by intrusion of carbon from the atmosphere. In any way, corrosion of the tubes due to decreased corrosion resistance caused by the carburization, decrease in the area of inner diameter of the tubes due to coke deposit and possible embrittlement subsequently caused is fatal to the furnace tube units.

There exists a single layer solid tube of Cr—Ni base heat resistant alloy in application for the above listed use. A group of the conventionally known materials are composed of (40–50) wt % Cr—Ni alloys disclosed in Unexamined Japanese Patent Publication (kokai)s Nos. 05-93240, 07-113139, 07-258782 and 07-258783. The alloys were designed to contain, in order to provide high temperature strength, 0.1–0.5 wt % of C and not more than 0.2 wt % of N, and additionally contain, as the components to enhance the high temperature strength, at least one element of Al, Nb, Ti, Zr or W. Another group is represented by an alloy steel disclosed in Unexamined Japanese Patent Publication (kokai) No. 05-1344. This alloy steel has alloy compositions containing 0.05–0.3 wt % of C and 0.1–0.6 wt % of N with the purpose of providing high temperature strength, not more than 5.0 wt % of Si as the component of giving resistance to carburization, and not more than 0.4 wt % of Mn and 0.001–0.02 wt % of Mg for improvement of the ductility.

These alloy compositions are, on one hand, effective for the purpose of providing high temperature strength and improving ductility, and on the other hand, could be rather harmful in anti-coking and or anti-carburizing characteristics, and thus, the conventional materials are not satisfactory from these points of view.

Then dual layered cast tube was developed so that base layer might function for high temperature resistance while the surface layer would work for anti-coking or anti-carburizing. "Insert casting" is a typical method for producing the double layered tubes. Unexamined Japanese Patent Publication (kokai) No. 60-170564 discloses a technology to produce bent tubes by using a previously heated insert in a shape of a bent tube and a sand mold as the outer mold and casting molten metal therebetween to obtain a cast product in which the bent tube is inserted. The drawback of this technology is that the surface of the insert which contacts with the molten metal melts and contaminates the molten metal. Further, in case where the cast product in thin, distribution of the molten metal will be insufficient, and defects such as incomplete surface fusion and blow holes often occur.

Another method for producing double layered tubes is centrifugal casting. Unexamined Japanese Patent Publication (kokai) Nos. 05-93238 and 05-93249 propose sequential casting which is composed of the first charging molten metal of high nickel Fe—Ni—Cr heat resistant steel in a centrifugal casting machine to cast the other layer, and then charging a molten metal of Cr—Ni alloy to cast and form the inner layer. In order to operate a centrifugal casting machine with high productivity, however, it is forced to charge the molten metal for inner layer before complete solidification of the outer layer. It has been known that, as far as coking is concerned, Fe acts as a catalyst for coke depositing, and therefore, is harmful. In case of combining the above alloy compositions, it is inevitable that Fe contained in the outer tube material diffuses into the inner layer material to reach the surface of the inner layer, and thus, it is not possible to produce multi-layered tube having excellent anti-coking characteristics. On the other hand, casting the inner layer after solidification of the outer layer results in cracking due to thermal expansion-contraction during solidification, and thus, it is quite difficult to produce desired tubes with practical yield.

Possible further way of producing double layered tubes is hot extrusion to form cladded tubes. Unexamined Japanese Patent Publication (kokai) No. 07-150556 proposes tube forming by hot rolling of a blank prepared by inserting a hollow billet of alloy having a suitable alloy composition into a hollow billet of a Ni—Fe—Cr heat resistant alloy. At present, however, the costs for production is so high that this kind of cladded tubes have no practical use in this field.

"Inchromizing" method is a technology to form a high chromium layer on the surface of a heat resistant metal tube. Thickness of the chromium rich layer formed by this technology is, however, 30 $\mu$m to 50 $\mu$m at highest, and thus, there is limitation in application to the parts of apparatus from which surface layer as a consumable will be lost by oxidation or carbonization.

Ethylene cracking reactor furnace (or ETHYLENE TUBE) produces ethylene by cracking naphtha at the toughest conditions where high temperature heat resisting and anti-coking material were critically demanded. Naphtha, as the feed steam mixture, passes through the ETHYLENE TUBE of the radiant section where thermal cracking takes place. The heat of conversion is provided by burners on the side wall or in the bottom of the radiant section, called fire box. During the very short residence time in the radiant coil (tenth of a second) at around 1000° C., the hydrocarbons including naphtha are cracked to ethylene, butadiene, butanes and aromatics. Since the tube material temperature in the fire box can often exceed 1100° C. (2021° F.), centrifugal cast high temperature, creep resistant alloys such as HK-40, HP-40 or HP Mod. are in use. While these conventional materials are good for creep rapture at 1100° C., precipitation and depositing of carbon and/or embrittlement of ETHYLENE TUBE accompanied with carbonization are inevitable. Built-up carbon coke needs a cyclical removal of coke which is accompanied with interrupting the operation (anti-coking). Embrittlement by carbonizing in a serious case needs replacement of the whole tube unit. Because of gas stream inside the tube being of hydrocarbon at high temperature the gas atmosphere will be origin for building carbon deposition on the surface of the tube metal. This will reduce run-length and also leads to subsequent diffusion into the tube material. The diffusion process or carbonization will cause many detrimental effects in the physical properties of the tube. The ductility, toughness, rupture time and melting will deduce the original grade progressively as the carbonization process goes on. This can eventually lead to prematured failure of the tubes by a set of attacks of thermal shock, stress rupture, thermal fatigue, or carbonization-induced cracking. In fact carbonization is the major cause of ethylene furnace failure in industry wide.

At the 11$^{th}$ Conference of Ethylene Makers held in Houston in March of 1999 there was a presentation for improvement of the ethylene tubes to give double layer coating of a Cr—Si alloy and Si—Al alloy on the substrate tube made of heat resistant alloy. This technology is effective to improve anti-coking characteristics. However, the coating needs huge investment for a metal powder, a ceramic powder and a polymer, and further, requires complicated steps to carry out the coating, i.e., a chemical treatment step for adhesion to form three layers which are an adhesion layer, diffusion layer and hard non-reactive layer, and inactivation of the surface layer. Thus, costs for preparing the double coated ethylene tubes are very high.

SUMMARY OF THE INVENTION

The object of the present invention is to provide a heat resistant metal tube which can be used under the conditions where carbon deposit and carburization easily occur at a high temperature, typically, in ethylene tubes of naphtha crackers, with improved performance or excellent anti-coking characteristics and anti-carburizing characteristics in the form of a multi-layered metal tube.

The heat resistant multi-layered metal tube having excellent anti-coking characteristics according to the present invention is made by forming a weld-mounted overlaid layer of a Cr—Ni—Mo— alloy by building-up welding layer on the inner surface and/or the outer surface of a substrate tube of heat resistant metal. In the tube, the alloy of the weld-mounted layer overlaid by building-up welding comprises, Cr: 36–49 wt %, Ni: 35–63 wt % and Mo: 0.5–5 wt % and the residuals.

BRIEF DESCRIPTION OF THE DRAWINGS

In the accompanying drawings:

FIG. 3A illustrates the shape of a base metal of the test piece; FIG. 3B, built-up welding; FIG. 3C, the flat surface of the test piece made by machining; FIG. 3D, a bead made by non-filler TIG welding, which is strained;

DETAILED DESCRIPTION OF THE INVENTION

Detailed description of the present invention will be described as follows.

Figure 1:
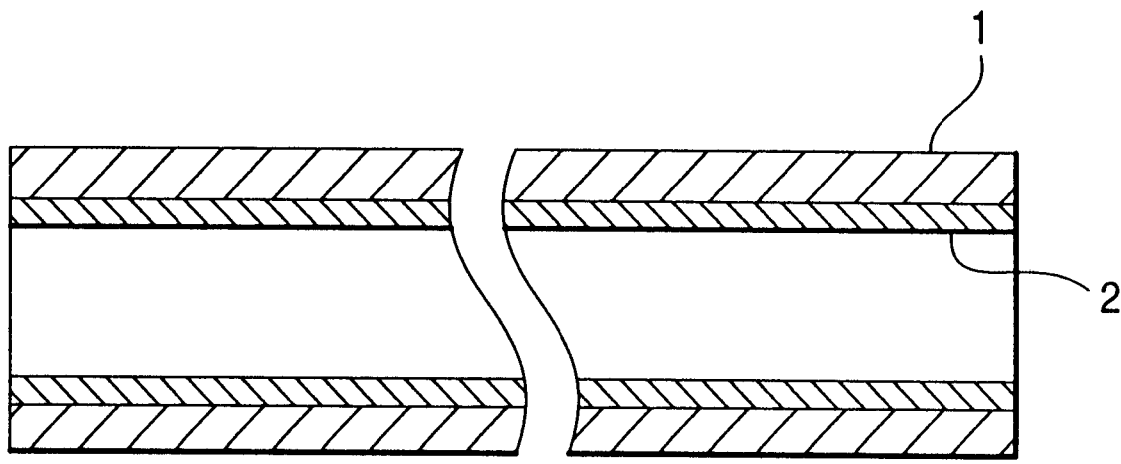
FIG. 1 is a longitudinal cross-section view of an example of heat resistant multi-layered metal tube according to the invention.
Figure 2:
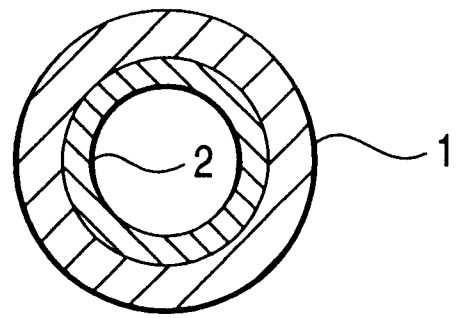
FIG. 2. is a cross-section view of the heat resistant multi-layered metal tube shown in FIG. 1.

The heat resistant multi-layered metal tube having excellent anti-coking characteristics according to the present invention is, as shown in FIG. 1 and FIG. 2, made by forming a weld-mounted overlaid layer of a Cr—Ni—Mo— alloy (2) by building-up welding layer on the inner surface and/or the outer surface (in the illustrated example, inner surface only) of a substrate tube (1) of heat resistant metal. In the tube, the alloy of the weld-mounted layer overlaid by building-up welding consists of, Cr: 36–49 wt %, Ni: 35–63 wt % and Mo: 0.5–5 wt % and the residuals.

The heat resistant metal which forms the tube substrate may by chosen from various alloys classified in heat resistant steels or heat resistant alloys, depending on the degree of heat resistance required to produce multi-layered heat resistant metal tubes. The following are examples of practical heat resistant metals.

* Iron-based alloy containing no less than 8 wt % of Cr. Typical steel grades are SUS403, SUS410, SUS304, SUS316, SUH3 and SUH4 in JIS classification.
* Heat resistant cast steel Typically, SCH15 and SCH16.
* HK-steels, particularly, HK-40 (25Cr—20Ni—0.4C—Fe)
* HP-steels, particularly, HP-40 (25Cr—35Ni—0.4C—Fe)
* HP-modified steel (25Cr—35Ni—0.4C—Nb/W)

The reason for restricting the alloy element composition in the Cr—Ni—Mo alloy which forms the weld-mounted overlaid layers by building-up of welding are as described below:

Cr: 36–49 wt %

Chromium is an important element necessary for increasing anti-oxidizing characteristics, and for achieving anti-coking characteristics aimed at in the present invention. To obtain these effects sufficiently not less than 36 wt % of Cr is necessary. In both cases, the more Cr-content increase, the more effects was brought. However, Cr of not less than 49 wt % makes it difficult to stabilize austenitic structure and decrease ductility. Thus, processings including bending tubes become less feasible and such alloy will lose utility. A preferable range in which the anti-coking characteristics stay sufficiently and the ductility is still maintained is Cr: 40–47 wt %.

Ni: 35–63 wt %

In order to keep the structure of the tubes stable in such a high temperature as the practical ethylene tubes are used and to achieve the intended anti-coking characteristics not less than 35 wt % of Ni is necessary. Though the anti-coking effect increases in accordance with the amount of Ni-content increase, in a higher content level the effect is not linearly increased to the content, and from the view point of economy, the upper limit is set up as 63 wt %. A preferable range of Ni is in the range of 51 to 58 wt %.

The portion of Ni can be replaced by Co. Such a replace makes no differences in effect of Ni, further more brings about some improvement in anti-coking characteristics.

However, Co is more expensive than Ni while the merits of replacing is not so high as the difference of price, and it is not advisable to use a large amount of Co. Usually, replacing 10 wt % of Ni will be recommendable and, at highest, maximum not more than 50 wt % is advisable.

Mo: 0.5–5 wt %

In order that the weld-mounted multi-layered metal tube of the present invention exhibits the desired performance, it is necessary for the metal of weld-mounted layer to provide excellent weldability, i.e., the deposition metal zone should have neither defects such as cracks nor blow holes, and further more, that the metal should have toughness and ductility. Mo is an essential component for providing these characteristics. As will be seen from the Test Examples described later, in regard to the effect of Mo addition, as far as the weldability is concerned, such a low content as 0.5 wt % level works for it, and the effect of weldability increases as the content increases. The effect, however, saturates soon in a relatively low percentage of content, and too much addition of Mo results in fading of high temperature strength and ductility. The upper limit of Mo is set up as 5 wt %. A preferable range of Mo is in the range of 0.75 to 2 wt %.

It is recommended to add the following components in addition to the above mentioned components:

B: 0.001–0.015 wt %

Addition of B improves weldability, particularly, crack sensitivity of the deposited metal. The effect is, as will be seen from the Test Example 2, described later, observed in such a small amount as 0.001 wt %, and disappears in a content exceeding 0.015 wt %. A suitable amount of addition should be chosen from the above range. The effect obtained by adding B will be enhanced in the alloy compositions by addition of Zr and/or REM in the amounts mentioned below. A preferable range of B is in the range of 0.001 to 0.005 wt %.

Zr: 0.001–0.015 wt %
REM: 0.0001–0.002 wt %

The synergy effect of B by Zr will be obtained by the addition of not less than 0.001 wt % of Zr, and saturates at the content around 0.015 wt % of Zr. The improvement of the effect of B by REM will be obtained by addition of not less than 0.0001 wt % of REM, and saturates at the content around 0.002 wt %. The effects are shown in Test Example 2. Zr and REM can be no doubt will be recommended used together. A preferable range of Zr is in the range of 0.001 to 0.01 wt %.

In order to ensure the high level anti-coking characteristics aimed by the invention, it is preferable to restrict the maximum amounts of some impurities contained in the weld-mounted overlaid alloy layer to keep the aimed quality. Such elements and the maximum contents are as follows:

Fe: not more than 10 wt %, preferably, not more than 5 wt %

Because Fe is a component which works for catalyst for coking, it is advisable to control its amount as low as possible. Otherwise, the structure of multi-layer in this invention will be of detriment and loose the spirit of invention. In a case where the product is used in relatively less severe conditions, Fe-content is permissible by not more than 10 wt %, and in other cases it must be controlled not more than 5 wt %. Without any special care in making Cr—Ni—Mo alloy weld-mounted layer in selection of materials, harmful enough level of Fe possibly comes into the product. The permissible amount of Fe as a impurity should be controlled from the balance of the quality of the product and cost economy.

C: Not more than 0.1 wt %, preferably, not more than 0.03 wt %

Usually, heat resistant steel requires a certain amount of C for the purpose of obtaining tensile strength and creep rupture strength. C is, however, harmful from the view point of corrosion resistance and anti-coking characteristics. In the multi-layered heat resistant weld-mounted metal tube of the invention, the strength is mainly born by the substrate tube, and therefore, it is not necessarily highly demanded that the overlaid metal should have high strength. Thus, C-content in the Cr—Ni—Mo alloy should be as low as possible. Not more than 0.1 of C is permissible, and preferably, not more than 0.03 wt %.

N: Not more than 0.3 wt %, preferably, not more than 0.1 wt %

Too large amount of N in the overlaid metal accelerates hardness and brittleness, and therefore, should be carefully avoided. N-content is limited to be not more than 0.3 wt %, preferably, 0.1 wt % or lower.

Si: Not more than 1.5 wt %, preferably, not more than 1.0 wt %

Si is a vital component for metallurgy, because it is added as a deoxidizer during infusion of alloys at refinery stage. However, Si lowers toughness and ductility, and the lower content thereof, the preferable. Permissible maximum limit is 1.5 wt %. A content less than 1.0 wt % is preferable.

Mn: Not more than 1.5 wt %, preferably, not more than 1.0 wt %

Mn is also a deoxidizing agent and often naturally is contained in alloys. To maintain the anti-coking characteristics in a high level the content of Mn should be controlled as small as possible. As a permissible limit 1.5 wt % is set up. However, a content of 1.0 wt % or lower is preferable.

P+S: Not more than 0.02 wt %

Both of the elements degrade weldability of the weld-mounted metal (particularly, by growing crack sensitivity). A total content exceeding 0.02 wt % causes cracks in the welded parts. A preferable range of P+S is in the range of 0.01 to 0.02 wt %.

O: Not more than 0.3 wt %

A large amount of O makes blow holes in the weld-mounted metal, which may provide layer with porous built-up. An O-content not exceeding 0.3 wt % gives no harmful influence The amount of O is preferably not more than 0.1 wt %.

In the preferable embodiments of the invention total amount of the impurities are restricted to as follows the amount of Fe as an impurity is restricted to not more than 5 wt %, and the total amount of the impurities inclusive of Fe, and the other elements are restricted to be not more than 10 wt %. Preferably, the amount of Fe as an impurity is restricted to not more than 1 wt %, and the total amount of the impurities inclusive of Fe and the other elements are restricted to be not more than 3%.

As is well known in the industry the deposited metal mounted by welding has an alloy composition made of blend of the filler metal and the base metal due to fusion of the latter and diffusion into the former. Also, low boiling point components in the filler metal may evaporate during welding, and as the result, chemical contents thereof in the weld-mounted metal layer become low. As the components used in the alloy, boron is volatile, and in regard to REM, the yield must be considered. In the implementation of the invention the chemical composition of the filler metal should be designed by taking these facts in full consideration.

Thickness of the weld-mounted built-up layer must be not less than 0.5 mm. In the built-up welding Fe and some other unfavorable components intrude from the base metal of a heat resistant metal tube, into the built-up layer. The thickness of the layer of not less than 0.5 mm will substantially prevent the surface of the built-up layer from intrusion of such unfavorable components. For the purpose of above mentioned ethylene tubes application, 1.5–2.0 mm of layer thickness will be sufficient. Thickness of 5 mm of thicker is usually not necessarily of industrial use.

It has been found that, for the coking, in addition to the metallurgical components of the tube, surface smoothness is an important factor. It is desirable that, for the purpose of avoiding coking, the surface of the tube which contacts hydrocarbon should be smooth enough. It is recommended from this point of view to polish the surface to prevent the tube surface from the built-up layer. From design policy of polishing, the maximum roughness is not more than 12 $\mu$m in Rmax.

The weld-mounted layer formation of the invention as the method for producing the multi-layered heat resistant metal tubes is a technology to produce a complex material by heating up filler material by means of arc, laser beam or electron beam as the energy source to melt the filler over the substrate surface so as to form a complex material in which a metal layer of a certain composition is weld-mounted to cover totally or partially the base metal as a combination of a different chemical composition materials. As the methods for combining two metallurgical different materials there exists various technologies other than the weld-mounted layer in the invention, such as HIP, CIP, explosion cladding, diffusion cladding and pressure welding. These technologies are, from the view point of economy of equipment and productivity, less economical, and therefore, not practical compared with the invention. The weld-mounted layer method has been practiced, because the technology can be carried out by using a relatively small-scale equipment for general purpose, and quality of the products can be achieved with ease.

Among the weld-mounted layer making technologies, one method as the most suitable for the present invention is plasma transfer arc welding, particularly, the method which uses filler metals in powder form. This technology is often called "PPW" (an abbreviation of "Plasma Powder Welding"), and hereinafter this abbreviation is used. In the other methods of welding such as gas-shielded arc, TIG or MIG which utilize heat power generated by arc between an electrode and a substrate, over the surface layer of the substrate in a condition of fully melt molten metal of the substrate mixed with the molten metal of the filler, and the mixing results in full amalgamation of the filler metal with the base metal. Percentage of the dilution well be 10–30%. In case a normal pure weld-mounted layer without dilution demanded, a double or triple mounted layers must be recommended.

On the contrarily to this, because the plasma transfer arc welding does not generates arc between a torch and the substrate but uses plasma arc pillar generated at the torch, although high temperature hot plasma is used as the heat source there needs no deep depth melting of the substrate surface by high power and focused melting. Therefore, the contamination of the filler metal by the base metal can be substantially avoided for practical use throughout the completion of the welding. This means that the difference in compositions of the filler metal and the deposited metal is strictly controlled to small, and the intended alloy design of composition in the deposited metal can easily be achieved. Plasma transfer arc welding enables erasing the impurities of the substrate surface by melting off, and further, inert gas used protects the molten pool and its neighborhood by preventing contamination of the molten metals from the environmental air and producing of defects such as blow holes.

Particularly, in PPW, because of powder metal as the filler metal used, it is not necessary to prepare the filler metal in the form of wires or rods. This facilitates the use of hardly processable materials. Thus, the method of producing a metal tube having excellent anti-coking characteristics according to the present invention is characterized by the steps of Plasma Powder Welding to form an weld-mounted overlaid layer, both on the inner surface and/or outer surface of a substrate tube made of a heat resistant metal, of the Cr—Ni—Mo alloy which are composed of the chemical composition described above. The designated chemical composition can be materialized not only by infusing each powder of the alloy to make final composition at site, but also by using a powder premixtured the component metals or alloys which will give the final Cr—Ni—Mo alloy composition.

A preferred solution for producing the multi-layered heat resistant metal tube which the excellent anti-coking characteristics in the invention was identified that it should have the smooth surface to be obtained over the weld-mounted layer to such extent that the maximum roughness, in Rmax, could be 12 $\mu$m or less by machining or polishing, in addition to the above mentioned strict tuning of chemistry.

The multi-layered heat resistant metal tube of the invention has the nature of high resistance in a temperature of 1100° C. and in high potential of coking and carburization, because of the reason that the substrate heat resistant metal tube maintains high temperature creeping resistance and the weld-mounted Cr—Ni—Mo alloy layer bears the anti-coking characteristics. Thus, even after continuous use of the invented tube in a long period, the amount of carbon depositing on the surface is quite limited and not solid. As a preferable method of weld-mounted layer by transfer arc welding, PPW, will provide overlaid layer of not less than 0.5 mm thick which will give sufficient anti-coking life to the ethylene tubes The coke preventive effect by the multi-layered heat resistant metal tube by the invention prevents those carburization which is generated by coking on the tube surface in a high carbon potential environment. Direct carburization of the metal surface in the atmosphere is also more preventive than that of conventional materials. The decrease of anti-corrosive characteristics and embrittlement of the material thereby should be fully prevented by the invention.

PPW can be implemented without using a large scale equipment, and the investment step of the method is relatively simple and needs relatively low cost.

EXAMPLES

Testing Example 1

Effect of Mo added to the multi-layered weld-mounted tube Different quantity of Mo was added to a Ni—Cr alloy to produce seven separate grades of Ni—Cr—Mo alloys. The molten alloys were atomized by gas atomization and gas cooling method, and the produced powders were classified by sieving. The powder in the range of under 60 to over 250 mesh were collected for use.

Figure 3A:
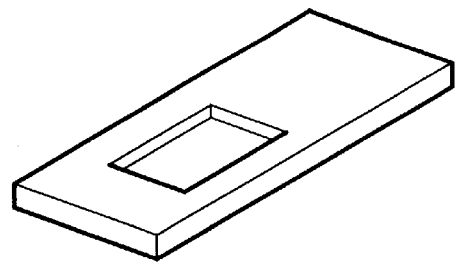
FIGS. 3A to 3D are perspective views illustrating "Variable Restrained Testing" carried out in the invention.
Figure 3B:
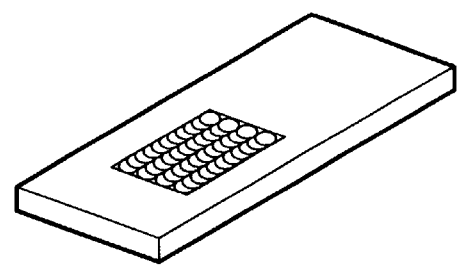
Figure 3C:
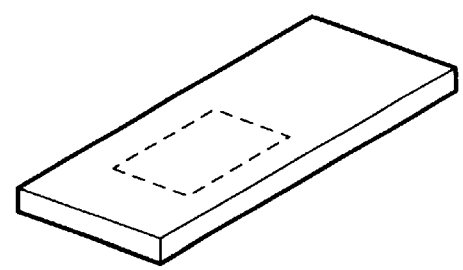
Figure 3D:
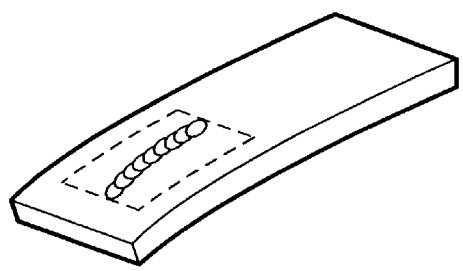

In order to evaluate weldability of the above alloy powders as fillers "Varestraint Test" were carried out. The "Varestraint Test" consists of machining a base metal (25Cr—35Ni—Nb—Fe) of 10 mm thick to form a recess of 5 mm deep (FIG. A); built-up welding by PPW of the above Ni—Cr—Mo alloy powders in three layers so that the top of the welded metal may exceed the base metal surface and that molten base metal may not influence the alloy composition of the overlaid layer at the surface (FIG. 3B); machining the weld metal to make the surface flat (FIG. 3C); forming a bead on the cladded layer surface by non-filler TIG welding, in which no filler material is used (current: 80A, welding speed: 8 cm/min.); rapidly causing strain while the bead does not solidify (FIG. 3D, strain: 2% ); and measuring the total length of cracks produced in the beads.

Chemical analysis of the surface layers of the seven overlaid layers showed the following alloy compositions (wt % ): (common components) Ni: 53 wt %, Cr: 44 wt % (Inherent Mo-contents) Mo: 0 2 wt %, 0.5 wt %, 0.8 wt %, 1.1 wt %, 2.0%, 4.0 wt % or 4.8 wt % (Common impurities restriction) C: not more than 0.03 wt %, Si: not more than 1.0 wt %, Mn: not more than 1.0 wt %, P+S: not more than 0.02 wt %, Fe: not more than 5 wt %, N: not more than 0.3 wt %, O: not more than 0.3 wt %.

Figure 4:
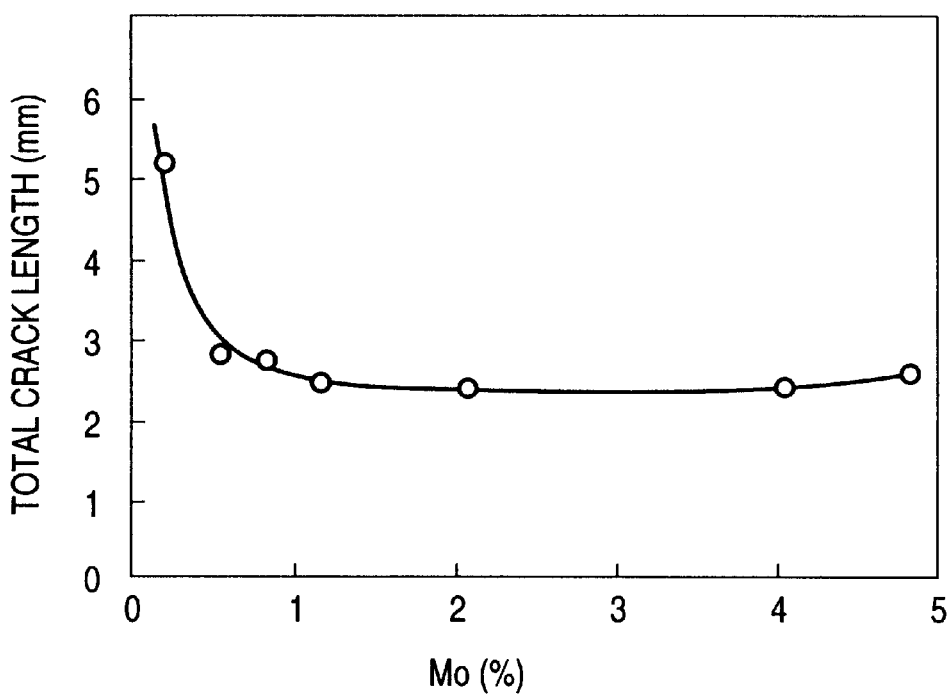
FIG. 4 is a graph showing a relationship between content of Mo in the overlaid alloys and weldability of the alloys obtained in the Testing Examples of the invention.

The results of the above Variable Restrained Testing are shown in the graph of FIG. 4. The graph illustrates that addition of Mo in an amount of 0.5–1.0% to the Ni—Cr alloy decreases frequency of cracks in the welded metal and thus improves weldability.

Testing Example 2

Effect of B addition and B+REM addition to the cladded alloy

Different amounts of B only, B+Zr, B+REM or B+Zr+REM were added to a Ni—Cr—Mo alloy to prepare eleven Ni—Cr—Mo alloys. Molten metals of these alloys were atomized by gas atomization and gas cooling method. The resulting powder were sieved and the fractions of under 60 to over 250 mesh were collected for use.

Using these powder as the filler the Variable Restrained Testing as described in Testing Example 1 were carried out. The alloy compositions of the obtained eleven overlaid layers (also of the surface layers) are as follows:

(Common chemical components to all the grades) Ni: 53 wt %, Cr: 44 wt %, Mo: 1.0 wt %

(Common impurities restriction to all the grades) C: not more than 0.03 wt %, Si: not more than 1.0 wt %, Mn: not more than 1.0 wt %, P+S: not more than 0.02 wt %, Fe: not more than 5 wt %, Ni: not more than 0.3 wt %, O: not more than 0.3 wt %

(Particular Additional Chemistry) as shown in Table 1 below:

TABLE 1

| Grade # | Content of B (wt %) | Content of Zr (wt %) | Content of REM (wt %) |
| --- | --- | --- | --- |
| 1 | — | — | — |
| 2 | 0.001 | — | — |
| 3 | 0.003 | — | — |
| 4 | 0.005 | — | — |
| 5 | 0.005 | 0.007 | — |
| 6 | 0.005 | 0.006 | 0.0008 |
| 7 | 0.012 | — | — |
| 8 | 0.012 | — | 0.0008 |
| 9 | 0.012 | 0.006 | 0.0008 |
| 10 | 0.015 | — | — |
| 11 | 0.018 | — | — |

Figure 5:
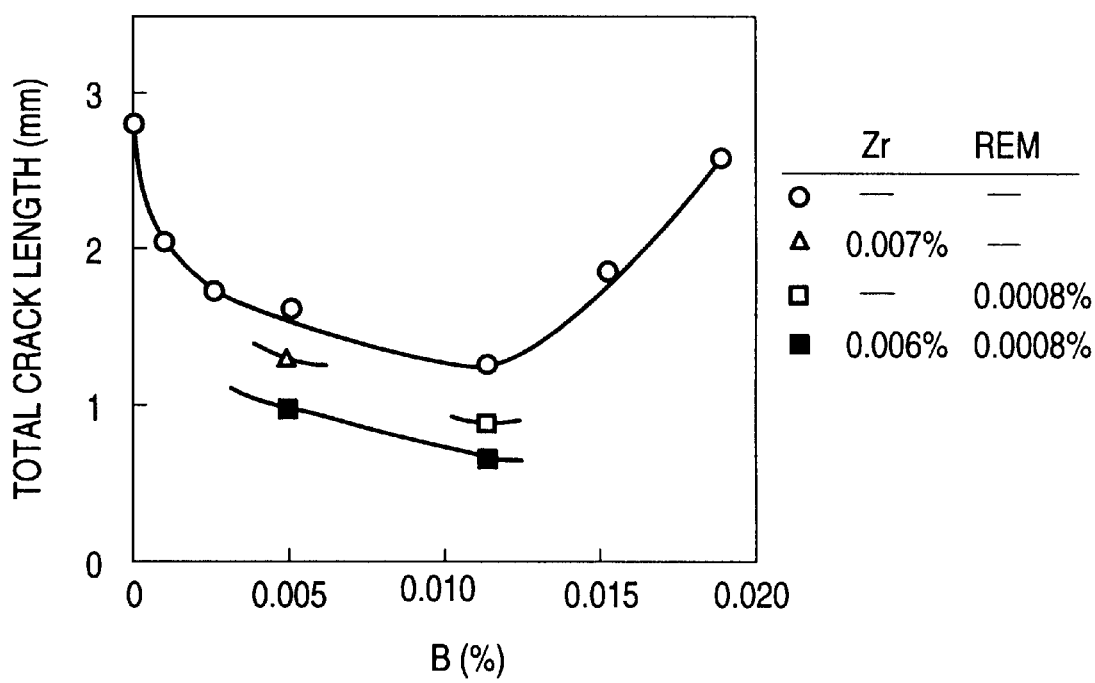
FIG. 5 is a graph showing the effect of weldability-improvement by addition of B, B+Zr, B+REM and B+Zr+ REM to the weld-mounted overlaid alloys in the Testing Examples of the invention.

The result of the tests are as shown in the graph of FIG. 5. From the graph it will be understood that addition of a small amount of B in a relatively narrow range improves weldability, and that addition of Zr or REM, particularly both of them, enhances the effect of B.

Working Example 1

Chemical Compositions of the Weld-mounted Layer Alloy and the Anti-coking Characteristics For the purpose of using the alloy powder for twenty-four grades of Cr—Ni—Mo weld-mounted layer alloys which may give the designated alloy compositions of the weld-mounted layers were prepared in the molten state. The molten metals were atomized by gas atomization and gas cooking method, and the resulting powders were sieved to collect the fractions in under 60 to over 250 mesh. The alloy of Control Example A has the same alloy composition as that of conventional HPM steel.

The above Cr—Ni—Mo alloy powders for the layer were welded by PPW method over the outer surfaces of SUS347 pipes having outer diameter of 10 mm, inner diameter of 4 mm and length 1.5 mm to form overlaid layers of 5 mm thick in full. Then, by boring holes of diameter 14 mm at the centers of the welded pipes with a center-boring machine (BTA), the SUS437 pipes used as the substrates and parts of the weld-mounted layers just outside the substrates were removed in full length. Thus, such pipes consisting of single layer of the weld-mounted metal with outer diameter 20 mm, inner diameter 14 mm and length 1.5 mm were obtained. The alloy compositions of the weld-mounted metals are as shown in Table 2.

Inner surfaces of the above pipes of the overlaid metal in single layer were polished to make Rmax, the maximum roughness, 3 μm or less. With respect to the pipe consisting of the weld-mounted, alloy layer having the composition of Run No. 2 in Table 2 the degree of polishing the inner surfaces was adjusted to be the following four grades: the first one has Rmax of around 3 μm the second one, very smooth surface of Rmax less than 2 μm the third one, relatively rough surface of Rmax around 7 μm, and the forth one, rough surface of Rmax 12 μm.

TABLE 2

Chemical Composition of Weld-mounted

| No. | Cr | Ni | Co | Mo | B | Zr | REM | Fe | C | Si | Mn | P + S | N | O | The impurities |
|---|---|---|---|---|---|---|---|---|---|---|---|---|---|---|---|
| 1 | 40.3 | 49.8 | — | 2.9 | 0.004 | 0.007 | — | 4.8 | 0.02 | 0.8 | 0.9 | 0.01 | 0.2 | 0.2 | 6.94 |
| 2 | 44.1 | 52.6 | — | 1.0 | 0.004 | — | — | 0.9 | 0.03 | 0.3 | 0.6 | 0.01 | 0.2 | 0.1 | 2.25 |
| 3 | 44.6 | 42.8 | 5.2 | 0.7 | 0.002 | — | 0.0007 | 4.7 | 0.03 | 0.7 | 0.9 | 0.02 | 0.1 | 0.1 | 6.66 |
| 4 | 45.1 | 47.2 | — | 1.9 | 0.003 | 0.008 | — | 3.8 | 0.02 | 0.9 | 0.6 | 0.02 | 0.2 | 0.1 | 5.75 |
| 5 | 45.3 | 47.5 | — | 2.3 | 0.004 | — | — | 3.4 | 0.02 | 0.5 | 0.7 | 0.01 | 0.1 | 0.1 | 4.94 |
| 6 | 45.5 | 45.0 | — | 2.6 | 0.005 | — | 0.0007 | 4.7 | 0.03 | 1.3 | 0.4 | 0.02 | 0.2 | 0.2 | 6.86 |
| 7 | 48.0 | 33.7 | 13.2 | 1.5 | 0.002 | — | — | 2.1 | 0.03 | 0.5 | 0.5 | 0.02 | 0.2 | 0.1 | 3.58 |
| 8 | 48.2 | 45.1 | — | 1.2 | 0.005 | — | — | 3.6 | 0.03 | 0.8 | 0.7 | 0.02 | 0.1 | 0.1 | 5.46 |
| 9 | 40.5 | 44.7 | — | 2.7 | 0.003 | — | 0.0008 | 9.5 | 0.05 | 0.9 | 1.2 | 0.02 | 0.2 | 0.1 | 12.08 |
| 10 | 48.4 | 40.1 | — | 0.9 | 0.004 | — | — | 8.2 | 0.08 | 0.9 | 0.8 | 0.02 | 0.2 | 0.2 | 10.61 |
| 11 | 39.5 | 47.9 | — | 3.5 | 0.004 | 0.007 | — | 6.3 | 0.13 | 1.1 | 0.9 | 0.02 | 0.2 | 0.2 | 9.06 |
| 12 | 39.8 | 24.8 | 21.2 | 3.2 | 0.005 | — | 0.0008 | 7.7 | 0.12 | 1.2 | 1.4 | 0.02 | 0.1 | 0.2 | 10.99 |
| 13 | 40.7 | 44.4 | — | 2.4 | — | — | — | 10.5 | 0.11 | 0.7 | 0.8 | 0.02 | 0.1 | 0.1 | 12.51 |
| 14 | 41.0 | 42.7 | — | 2.1 | 0.003 | — | — | 11.6 | 0.09 | 1.3 | 0.6 | 0.01 | 0.1 | 0.2 | 14.15 |
| 15 | 43.4 | 41.7 | — | 1.6 | 0.005 | — | — | 10.2 | 0.10 | 1.4 | 1.1 | 0.02 | 0.2 | 0.1 | 13.33 |
| 16 | 43.7 | 46.0 | — | 1.3 | 0.003 | 0.008 | — | 6.4 | 0.11 | 1.2 | 0.7 | 0.02 | 0.2 | 0.2 | 9.01 |
| 17 | 44.8 | 41.8 | — | 0.5 | — | — | — | 9.8 | 0.12 | 1.4 | 1.0 | 0.02 | 0.1 | 0.2 | 12.87 |
| 18 | 45.0 | 41.1 | — | 1.1 | 0.004 | — | — | 10.3 | 0.10 | 0.7 | 1.1 | 0.01 | 0.2 | 0.2 | 12.84 |
| 19 | 45.7 | 36.5 | — | 4.8 | 0.005 | — | — | 10.9 | 0.07 | 0.9 | 0.6 | 0.01 | 0.2 | 0.1 | 13.00 |
| 20 | 47.2 | 37.4 | — | 2.2 | 0.004 | — | — | 11.1 | 0.11 | 0.7 | 0.7 | 0.01 | 0.1 | 0.2 | 13.15 |
| 21 | 48.5 | 37.1 | — | 0.7 | 0.003 | 0.007 | — | 10.7 | 0.12 | 1.2 | 1.1 | 0.01 | 0.1 | 0.2 | 13.68 |
| A | 25.0 | 35.0 | — | — | 0.004 | — | — | 37.2 | 0.40 | 1.2 | 0.7 | 0.02 | 0.1 | 0.1 | 39.95 |
| B | 31.5 | 31.0 | — | 4.8 | 0.003 | — | — | 30.4 | 0.10 | 1.0 | 0.5 | 0.02 | 0.2 | 0.2 | 32.65 |
| C | 35.8 | 44.1 | — | 2.1 | 0.005 | — | — | 15.4 | 0.08 | 0.8 | 1.3 | 0.01 | 0.1 | 0.1 | 18.02 |

Note: Nos. 1 to 21: Examples
Nos. A to C: Comparative Examples

Sample pieces, designed and welded in the way of the above description, were put in a testing furnace for simulating ethylene production condition. In furnace the tube was heated up to 1100 DC. In the tube, vaporized naphtha with steam normally passed through the tube at speed of 0.5 m/second. The test run was carried out for 100 hours. The passing speed of hydrocarbon and exposing time of Cr—Ni—Mo tube in hydrocarbon gas in the furnace was accelerated nearly 300 times of toughness in coke depositing condition compared with the real production site. (0.5 m/sec vs 150 m/sec in speed, and 14 mm ID tube vs. 3.5'–4" ID tube in exposing hydrocarbon density per square mm on the internal surface wall).

Gas pressure was measured for identifying the degree of blockage of the tube by coke deposit as the following equation.

GP; Gas Pressure (GP at ending of the test−GP at beginning)/(GP at beginning)×100 (%)

Figure 6:
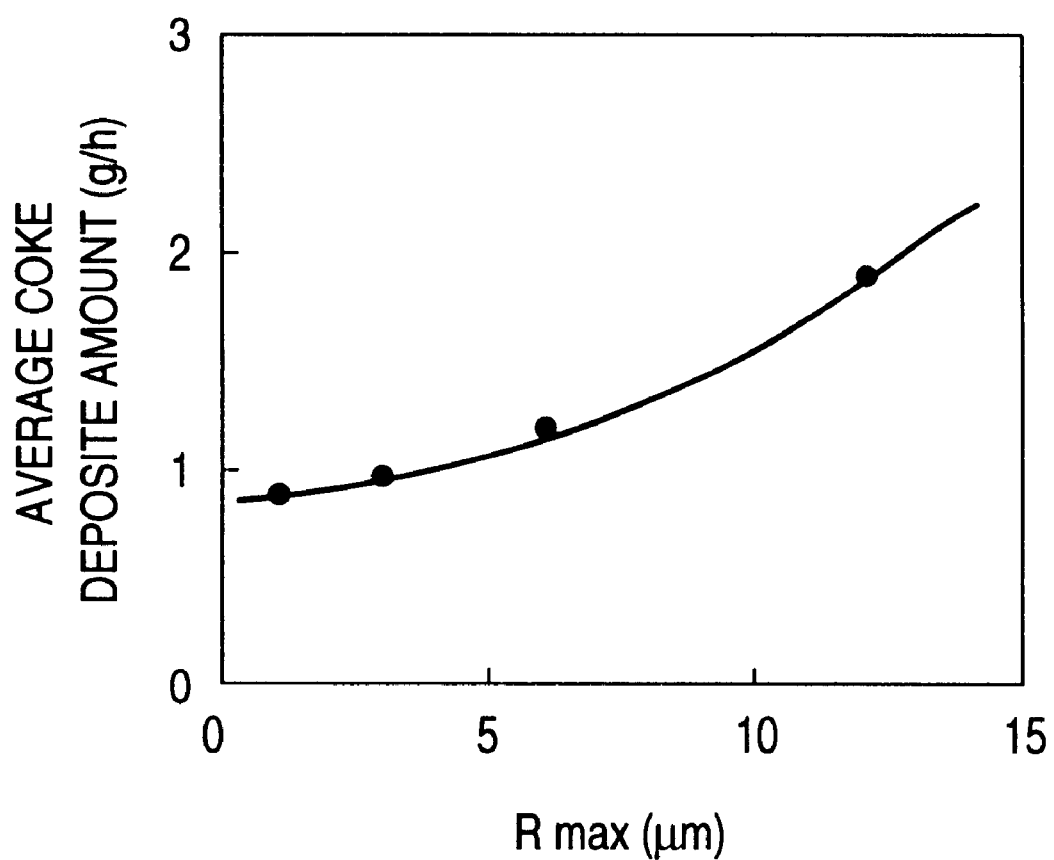
FIG. 6 is a graph showing the affect of surface smoothness of the weld-mounted overlaid alloy in regard to anti-coking characteristics in the Working Examples of the invention.

The testing tubes were chilled and measured the weight of the coke deposit. Gross weight minus the tube metal weight was estimated as the coke deposit weight. Coke deposit amount per hour and pressure measurement were recorded in the Proof Test 2. The effect of smoothness for coke preventive quality by using Proof Sample 2 material was shown in the graph of FIG. 6.

Then PPW weld-mounted tube was put into carburization furnace and heated up to 1100° C. in the atmosphere of carburizing accelerated by Degussa KG3 and was kept for 200 hours there. After that the sample pieces were pulled out for measurement of the depth of the carburized area ("the carbonized area" was identified so when the carbon content increased by more than 2 wt %). The results of carbonization as well as coke deposit amount and also the shift of pressure were recorded in Table 3.

TABLE 3

Anti-coking and anti-carbonizing quality in PPW Weld-mounted Layer Tube (PPW WMLT)

| Proof # | Shift of pressure (%) | Coke deposit pace (g/hr) | Remark | Carburized depth (mm) |
|---|---|---|---|---|
| 1 | 3 | 1.7 | Excellent | 0.1 |
| 2 | 0 | 1.0 | Excellent | 0.05 |
| 3 | 2 | 1.4 | Excellent | 0.2 |
| 4 | 3 | 1.6 | Excellent | 0.1 |
| 5 | 2 | 1.3 | Excellent | 0.2 |
| 6 | 3 | 1.7 | Excellent | 0.2 |
| 7 | 1 | 1.2 | Excellent | 0.1 |
| 8 | 3 | 1.6 | Excellent | 0.1 |
| 9 | 4 | 2.0 | Good | 0.4 |
| 10 | 4 | 1.9 | Good | 0.6 |
| 11 | 5 | 2.3 | Fair | 1.5 |
| 12 | 4 | 2.1 | Fair | 1.3 |
| 13 | 5 | 2.3 | Fair | 1.4 |
| 14 | 5 | 2.2 | Fair | 1.6 |
| 15 | 5 | 2.2 | Fair | 1.5 |
| 16 | 4 | 2.1 | Fair | 1.4 |
| 17 | 4 | 2.1 | Fair | 0.8 |
| 18 | 5 | 2.3 | Fair | 0.8 |
| 19 | 5 | 2.3 | Fair | 1.1 |
| 20 | 5 | 2.4 | Fair | 1.0 |
| 21 | 5 | 2.1 | Fair | 0.9 |
| A | 23 | 3.5 | Poor | Not tested |
| B | 15 | 3.3 | Poor | Not tested |
| C | 7 | 3.1 | Poor | Not tested |

Note: Nos. 1 to 21 are Examples
Nos. A to C are Comparative Examples

Working Example 2

Practical use in Naphtha Cracker

Among of the Cr—Ni—Mo alloys subjected to the tests for anti-coking and anti-carburizing characteristics in Working Example 1, three alloy powders of Run Nos. 2, 7 and 10, which gave relatively good results, were picked up for application for practical ethylene tubes of a naphtha cracker.

For the heat resistant metal tube substrate, HP-modified steel (alloy composition: 0.4C—1.2Si—34.9Ni—25.0Cr—1.2Nb—Fe), with an outer diameter of 95 mm, thickness of 9 mm (accordingly, inner diameter is 77 mm) and length 2 m were used, as conventionally used for the material of ethylene tubes. The above alloys were overlaid by built-up welding. The inner surfaces of the tubes were polished to decrease the surface roughness to Rmax of 3 μm or less.

These ethylene tubes were installed in a naphtha cracker and used. After 60 days continuous operation of cracking, the tubes were taken out from the cracker and amount of carbon deposit were measured to verify anti-coking characteristics. The results are in Table 4.

TABLE 4

Quantity of coke deposit in the tube

| Proof # of Coke deposit quantity | PPW Alloy (cumulative weight in 60 days) (g) |
| --- | --- |
| No. 2 | 702 |
| No. 7 | 851 |
| No. 10 | 1354 |

It is to be understood that the invention is not limited in its application to the details of production process, illustration of chemical design and arrangement of production equipment in the accompanying drawings, since the invention is capable of other embodiments and of being practiced or carried out in various ways. Also it is to be understood that the phraseology or terminology employed herein is for the purpose of description and not of limitation.

We claim:

1. A multi-layered heat resistant metal tube having excellent anti-coking characteristics, comprising:
    a substrate tube material comprising a heat resistant metal; and
    a weld-mounted overlaid layer comprising an alloy comprising Cr: 36–49 wt %, Ni: 35–63 wt % and Mo: 0.5–5 wt %, which is building-up welded over at least one of an inner surface and an outer surface of said substrate tube material.

2. The multi-layered heat resistant metal tube according to claim 1, wherein said heat resistant metal is one selected from the group consisting of an iron-based alloy containing at least 8 wt % of Cr, a heat resistant cast steel, an HK-grade steel, an HP-grade steel and a modified HP-grade steel.

3. The multi-layered hear resistant metal tube according to claim 1, wherein said alloy has an alloy composition in which a part of Ni is replaced by Co.

4. The multi-layered heat resistant metal tube according to claim 1, wherein said alloy further comprises B: 0.001–0.015 wt %.

5. The multi-layered heat resistant metal tube according to claim 4, wherein said alloy further comprises at least one of Zr: 0.001–0.015 wt % and REM: 0.0001–0.002 wt %.

6. The multi-layered heat resistant metal tube according to claim 1, wherein said alloy contains impurities comprising C: not more than 0.1 wt %, N: not more than 0.3 wt %, Si: not more than 1.5 wt %, Mn: not more than 1.5 wt %, Fe: not more than 10 wt %, P+S: not more than 0.02 wt % and O: not more than 0.3 wt %.

7. The multi-layered heat resistant metal tube according to claim 4, wherein said alloy contains impurities comprising C: not more than 0.1 wt %, N: not more than 0.3 wt %, Si: not more than 1.5 wt %, Mn: not more than 1.5 wt %, Fe: not more than 10 wt %, P+S: not more than 0.02 wt % and O: not more than 0.3 wt %.

8. The multi-layered heat resistant metal tube according to claim 5, wherein said alloy contains impurities comprising C: not more than 0.1 wt %, N: not more than 0.3 wt %, Si: not more than 1.5 wt %, Mn: not more than 1.5 wt %, Fe: not more than 10 wt%, P+S: not more than 0.02 wt % and O: not more than 0.3 wt %.

9. The multi-layered heat resistant metal tube according to claim 6, wherein the amount of Fe as one of the impurities is restricted to be not more than 5 wt % by weight, and the total amount of the impurities inclusive of Fe and the other impurities is restricted to be not more than 10 wt % by weight.

10. The multi-layered heat resistant metal tube according to claim 7, wherein the amount of Fe as one of the impurities is restricted to be not more than 5 wt % by weight, and the total amount of the impurities inclusive of Fe and the other impurities is restricted to be not more than 10 wt % by weight.

11. The multi-layered heat resistant metal tube according to claim 8, wherein the amount of Fe as one of the impurities is restricted to be not more than 5 wt % by weight, and the total amount of the impurities inclusive of Fe and the other impurities is restricted to be not more than 10 wt % by weight.

12. The multi-layered heat resistant metal tube according to claim 9, wherein the amount of Fe as one of the impurities is restricted to be not more than 1 wt % by weight, and the total amount of the impurities inclusive of Fe and the other impurities is restricted to be not more than 3 wt % by weight.

13. The multi-layered heat resistant metal tube according to claim 10, wherein the amount of Fe as one of the impurities is restricted to be not more than 1 wt % by weight, and the total amount of the impurities inclusive of Fe and the other impurities is restricted to be not more than 3 wt % by weight.

14. The multi-layered heat resistant metal tube according to claim 11, wherein the amount of Fe as one of the impurities is restricted to be not more than 1 wt % by weight, and the total amount of the impurities inclusive of Fe and the other impurities is restricted to be not more than 3 wt % by weight.

15. The multi-layered heat resistant metal tube according to claim 1, wherein said building-up welding is performed by Plasma Powder Welding method.

16. The multi-layered heat resistant metal tube according to claim 1, wherein a thickness of said weld-mounted overlaid layer is at least 0.5 mm.

17. The multi-layered heat resistant metal tube according to claim 15, wherein a thickness of said weld-mounted overlaid layer is at least 0.5 mm.

18. A multi-layered heat resistant metal tube according to claim 1, wherein a surface of said weld-mounted overlaid layer has Rmax, the maximum roughness, of 12 μm or less by polishing.

19. A multi-layered heat resistant metal tube according to claim 17, wherein a surf ace of said weld-mounted overlaid layer has Rmax, the maximum roughness, of 12 μm or less by polishing.

20. A method of manufacturing a multi-layered heat resistant metal tube having excellent anti-coking characteristics; comprising the step of, by Plasma Powder Welding, forming a weld-mounted overlaid layer comprising an alloy comprising Cr: 36–49 wt %, Ni: 35–63 wt % and Mo: 0.5–5 wt %, over at least one of an inner surface and an outer surface of a substrate tube material.

21. The method of manufacturing the multi-layered heat resistant metal tube according to claim 20, further comprising the step of polishing a surface of the weld-mounted overlaid layer formed by building-up welding so that Rmax, the maximum surface roughness, of the polished surface is 12 μm or less.

* * * * *